J. E. KAMPE.
POISING CALIPERS.
APPLICATION FILED MAR. 27, 1911.
1,001,278.
Patented Aug. 22, 1911.
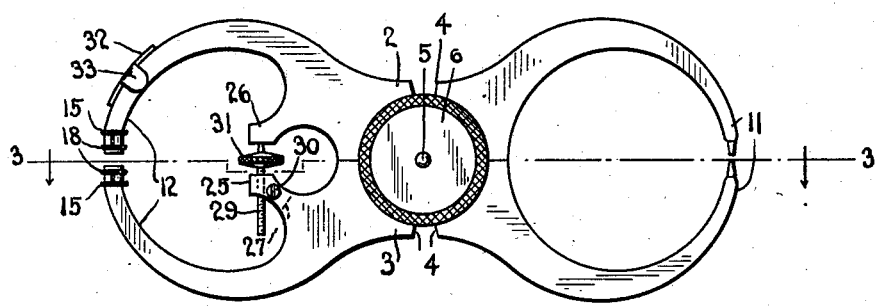
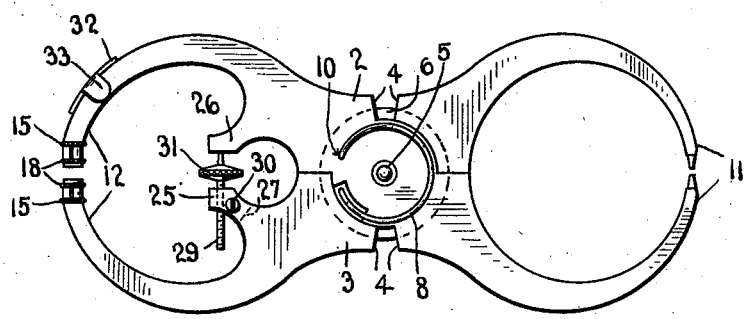
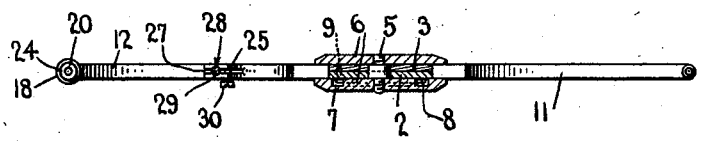
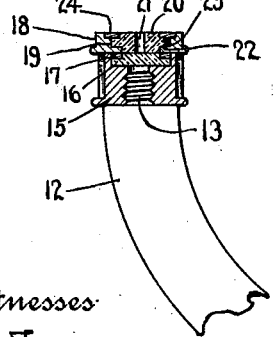
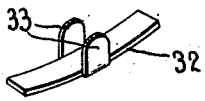
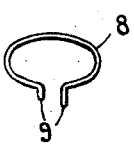
Witnesses
L. B. James
O. B. Hopkins
Inventor
J. E. Kampe
by H. B. Willson & Co.
Attorneys
COLUMBIA PLANOGRAPH CO., WASHINGTON, D. C.

UNITED STATES PATENT OFFICE.

JOHN E. KAMPE, OF WALTHAM, MASSACHUSETTS.

POISING-CALIPERS.

1,001,278.

Specification of Letters Patent.   Patented Aug. 22, 1911.

Application filed March 27, 1911.   Serial No. 617,139.

*To all whom it may concern:*

Be it known that I, JOHN E. KAMPE, a citizen of the United States, residing at Waltham, in the county of Middlesex and State of Massachusetts, have invented certain new and useful Improvements in Poising-Calipers; and I do declare the following to be a full, clear, and exact description of the invention, such as will enable others skilled in the art to which it appertains to make and use the same.

This invention relates to improvements in poising calipers.

One object of the invention is to provide a caliper of this character by means of which the balance wheel of a watch may be accurately poised.

Another object is to provide an improved construction and arrangement of jeweled bearings for receiving the pivot pin or trunnions of a balance wheel whereby the latter is revolubly supported.

Still another object is to provide an improved construction and arrangement of closing spring whereby the legs of the calipers are brought together and held in yielding engagement with the pivot pin of the balance wheel.

A further object is to provide improved means for operatively supporting the leg adjusting screw, and to provide means whereby the leg of the caliper is prevented from being worn by the operating instruments.

With these and other objects in view, the invention consists in the improved construction, combination and arrangement of parts hereinafter fully described and particularly pointed out in the appended claims.

In the accompanying drawings:—Figure 1 is a plan view of my improved calipers; Fig. 2 is a similar view with one of the side plates removed; Fig. 3 is a central longitudinal sectional view; Fig. 4 is an enlarged central longitudinal sectional view of the jeweled bearing of one of the caliper legs; Fig. 5 is a detail perspective view of the spring for holding the legs of the caliper in operative position; Fig. 6 is a detail perspective view of a wear plate adapted to be engaged with the caliper legs.

The invention is herein shown in the form of a combined poising and hair spring truing caliper, comprising a pair of leg members 2 and 3 arranged across each other and having their engaging faces provided with circular mortises whereby the outer surfaces of the engaging parts will be flush. The opposite side edges of the engaged parts are cut away as shown at 4 to permit a limited pivotal movement of the members. The members are pivotally connected together at their point of crossing by a pin 5 the ends of which are threaded as shown, to receive circular side plates or washers 6 in the inner side of one of which is formed a circular groove 7 in which is arranged a substantially circular spring 8 having its ends bent laterally at right angles to form fastening studs 9 one of which is adapted to enter a hole 10 in the leg member 2 and the other stud to be inserted through a slot in said leg member 2 and into a hole in the member 3 whereby the pressure of the spring will be exerted to close or to hold the members in operative position.

On one end of the members 2 and 3 are formed curved legs 11 which are adapted particularly for truing balance wheels. On the opposite ends of the members 2 and 3 are formed curved legs 12 having their outer ends reduced and threaded forming studs 13 to receive sockets 15 in which are arranged flat circular jewels 16 which provide thrust bearings for the end of the pintles of the balance wheel. The jewels 16 have in their outer side edges annular recesses to receive annular washers 17. Adapted to be engaged with the sockets 15 are bearing caps 18 split on opposite sides of their inner ends for a portion of their lengths whereby they are frictionally engaged with the sockets. In the outer ends of the caps 18 are formed annular seats 19 with which are engaged annular bearing jewels 20 in which are formed centrally disposed bearing passages 21 adapted to receive and hold the pintles of a balance wheel. The jewels 20 have in their outer side edges annular recesses 22 with which and with similar recesses 23 formed in the adjacent outer sides of the caps are engaged retaining washers 24 whereby the jewels are held in place. By thus arranging the jewels 16 and 20 true bearings are provided for revolubly supporting or poising the balance wheels of watches. The jewels 16 and 20 when secured in the manner described may be readily removed for cleaning.

On the inner edges of the legs 2 near their point of crossing are formed inwardly extending lugs 25 and 26. The lug 25 is split or bifurcated as at 27 and has formed in the split surfaces semi-circular grooves 28. The grooves 28 are threaded and with the same is engaged a leg adjusting screw 29. The bifurcated members of the lug 25 are held in position to receive the screw 29 and are adjusted to take up wear and regulate their tension by a clamping screw 30 which passes through one member and engages in a transversely disposed threaded aperture formed in the other member. The inner end of the leg adjusting screw 29 is tapered and is adapted to abut against the lug 26 whereby when the screw is turned in one direction or the other, the legs 12 will be adjusted to the proper position for receiving and revolubly supporting balance wheel pintles of different lengths. On the screw 29 is a milled head 31 whereby the screw may be readily turned.

Adapted to be engaged with the caliper legs at any desired point is a wear plate 32 which is designed to prevent the wearing of the caliper by the tweezers or other instrument employed in poising the balance wheel. The plate 32 is provided with spring gripping lugs 33 adapted to be engaged with the legs of the caliper whereby the plate is secured at the desired position thereon.

From the foregoing description taken in connection with the accompanying drawings, the construction and operation of the invention will be readily understood without requiring a more extended explanation.

Various changes in the form, proportion and the minor details of construction, may be resorted to without departing from the principle or sacrificing any of the advantages of this invention, as defined in the appended claims.

Having thus described my invention, what I claim is:

1. A caliper of the character described comprising pivotally connected members, pairs of legs formed on the ends of said members, jewel sockets detachably secured to the ends of one pair of said legs, jewels arranged in said sockets, split caps having a frictional engagement with said sockets, apertured bearing jewels arranged in said caps to coact with the jewels in said sockets, a spring to yieldingly hold said legs in their adjusted positions and means to adjust the same.

2. A caliper of the character described comprising pivotally connected members, pairs of legs formed on the opposite ends of said members, a closing spring having its ends connected with the members whereby the legs are closed and yieldingly held in their adjusted positions, a pivot pin arranged through said members, said pins having threaded ends, side plates having a threaded engagement with the ends of said pin one of said plates having in its inner side an annular groove adapted to receive said spring, jeweled bearings detachably engaged with the outer end of said legs and means whereby the latter are adjusted.

3. A caliper of the character described comprising pivotally connected members, legs formed on said members, lugs formed on the inner edges of said legs one of said lugs being bifurcated and having formed therein, alined threaded grooves, an adjusting screw having a threaded engagement with said grooves and adapted to engage the lug on the opposite leg, a clamping screw arranged in said bifurcated lug whereby the tension of the same on said adjusting screw is regulated, an operating head on said adjusting screw, a spring to hold said legs in their adjusted positions, jeweled bearings on the outer ends of said legs and a wear plate removably engaged with the legs of the caliper.

In testimony whereof I have hereunto set my hand in presence of two subscribing witnesses.

JOHN E. KAMPE.

Witnesses:
 DOROTHY VON KAMECKE,
 AUSTIN T. JORDAN.

---

Copies of this patent may be obtained for five cents each, by addressing the "Commissioner of Patents, Washington, D. C."